United States Patent [19]

Trease et al.

[11] Patent Number: 4,852,235

[45] Date of Patent: Aug. 1, 1989

[54] BEARING PULLER

[76] Inventors: Dwaine A. Trease, P.O. Box 122, Clearwater, Nebr. 68726; Leroy E. Trease, P.O. Box 115, Pleasant Dale, Nebr. 68423

[21] Appl. No.: 234,630

[22] Filed: Aug. 19, 1988

[51] Int. Cl.[4] ............ B23P 19/04

[52] U.S. Cl. ............ 29/263

[58] Field of Search ............ 29/258–263, 29/265, 280

[56] References Cited

U.S. PATENT DOCUMENTS

| | | | |
|---|---|---|---|
| 1,632,720 | 7/1927 | Worster | 29/262 |
| 2,360,781 | 10/1944 | McGinnis et al. | 29/261 |
| 2,619,318 | 10/1952 | McCord | 29/263 |
| 2,646,619 | 7/1953 | McCord | 29/263 |
| 3,611,540 | 10/1971 | Gibu | 29/263 |
| 4,274,189 | 6/1981 | Conover | 29/256 |

FOREIGN PATENT DOCUMENTS

| | | | |
|---|---|---|---|
| 269334 | 4/1927 | United Kingdom | 29/259 |

*Primary Examiner*—Robert C. Watson
*Attorney, Agent, or Firm*—Zarley, McKee, Thomte, Voorhees & Sease

[57] ABSTRACT

A bearing puller comprising an elongated body member having a plurality of gripping arms at one end thereof with gripping shoulders being provided at the free end of each of the gripping arms. An elongated bolt is threadably mounted in the body member and has one end positioned between the gripping arms. A sleeve is longitudinally slidably mounted on the bolt and is designed to deflect the gripping arms outwardly when moved into a first position and to prevent inward deflection of the gripping arms during the bearing removal process. An actuator slidably embraces the body member and is operatively connected to the sleeve to enable the sleeve means to be selectively positoned. In a modified form of the invention, the bolt member is not utilized but is replaced by a slide hammer operatively attached to the body member.

7 Claims, 4 Drawing Sheets

BEARING PULLER

BACKGROUND OF THE INVENTION

This invention relates to a puller device and more particularly to a device for pulling or extracting annular members, such as pilot bearings, bearings, etc. from the members in which they are mounted.

Many types of pulling devices such as bearing pullers have been previously provided. For example, see U.S. Pat. Nos. 2,052,304; 3,964,149; and 1,131,868. All of the prior art devices suffer the same shortcoming in that there is no adequate structure for positively maintaining the work-engaging portions, shoulders or lugs with the member being pulled. Further, those prior art devices which employ a shaft engaging bolt are less than satisfactory since the rotation of the bolt tends to cause the bolt to be laterally displaced with respect to the shaft as the bolt is being rotated to apply pulling pressures to the work-engaging surfaces.

It is therefore a principal object of the invention to provide an improved pulling device.

A further object of the invention is to provide a pulling device for pulling annular members such as bearings or the like from their supporting members.

Still another object of the invention is to provide a device of the type described which includes a plurality of work-engaging members with means being provided to maintain the work-engaging members in positive engagement with the member being pulled.

Still another object of the invention is to provide a device of the type described including means on the end of the bolt associated therewith for preventing displacement of the bolt as the bolt is being rotated to pull the annular member from its supporting member.

Still another object of the invention is to provide a device of the type described which is easy to use.

Yet another object of the invention is to provide a device of the type described which is economical of manufacture, durable in use and refined in appearance.

These and other objects will be apparent to those skilled in the art.

BRIEF DESCRIPTION OF THE DRAWINGS

FIG. 4 is a longitudinal sectional view of the puller of this invention illustrating the manner in which the puller is inserted into the opening of a bearing or the like:

FIG. 8 is a partial longitudinal sectional view illustrating the apparatus of FIG. 7 being employed to remove a bearing from a flywheel or the like.

SUMMARY OF THE INVENTION

The pulling device or puller of this invention is designed to pull or remove annular members such as bearings or the like from supporting members such as flywheels, etc. without the necessity of removing the flywheel, etc. from the vehicle or the like. In the preferred embodiment, an elongated body member is provided which includes a plurality of work-engaging fingers or arms which are adapted to be inserted through the annular opening in the bearing. The free ends of the work-engaging arms are provided with gripping teeth extending outwardly therefrom which are adapted to be positioned on the back side of the bearing. A bolt member is threadably mounted in the body member and is adapted to have one end thereof engage the crankshaft or the like so that rotation of the bolt will cause the body member to pull the bearing from its supporting member. A sleeve is positioned between the bolt member and the inner surfaces of the arms to prevent the arms from being deflected inwardly as the bearing is being pulled. An actuator is connected to the sleeve to enable the sleeve to be selectively positioned. One end of the bolt member is provided with a rotatable member provided thereon to prevent displacement of the bolt member with respect to the crankshaft or the like as the bolt member is being rotated. In a modified form of the invention, the pulling force is achieved through the use of a slide hammer assembly operatively connected to the body member.

DESCRIPTION OF THE PREFERRED EMBODIMENT

Figure 7:
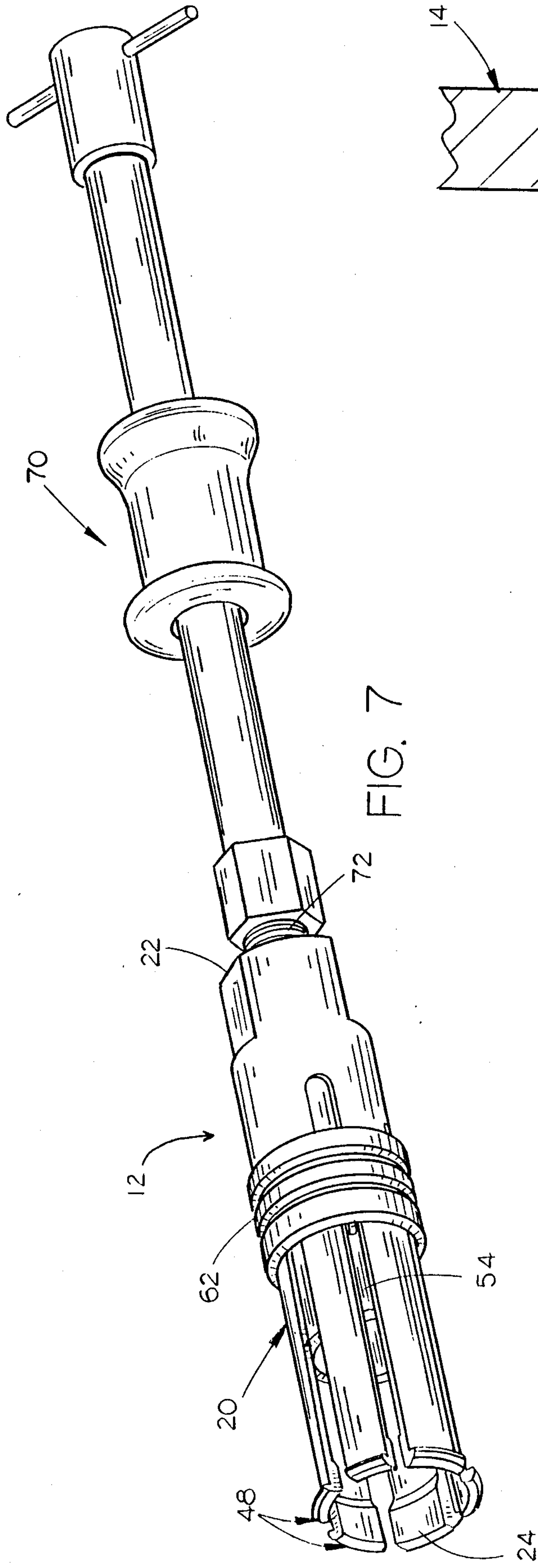
FIG. 7 is a perspective view of a modified form of the invention.
Figure 8:
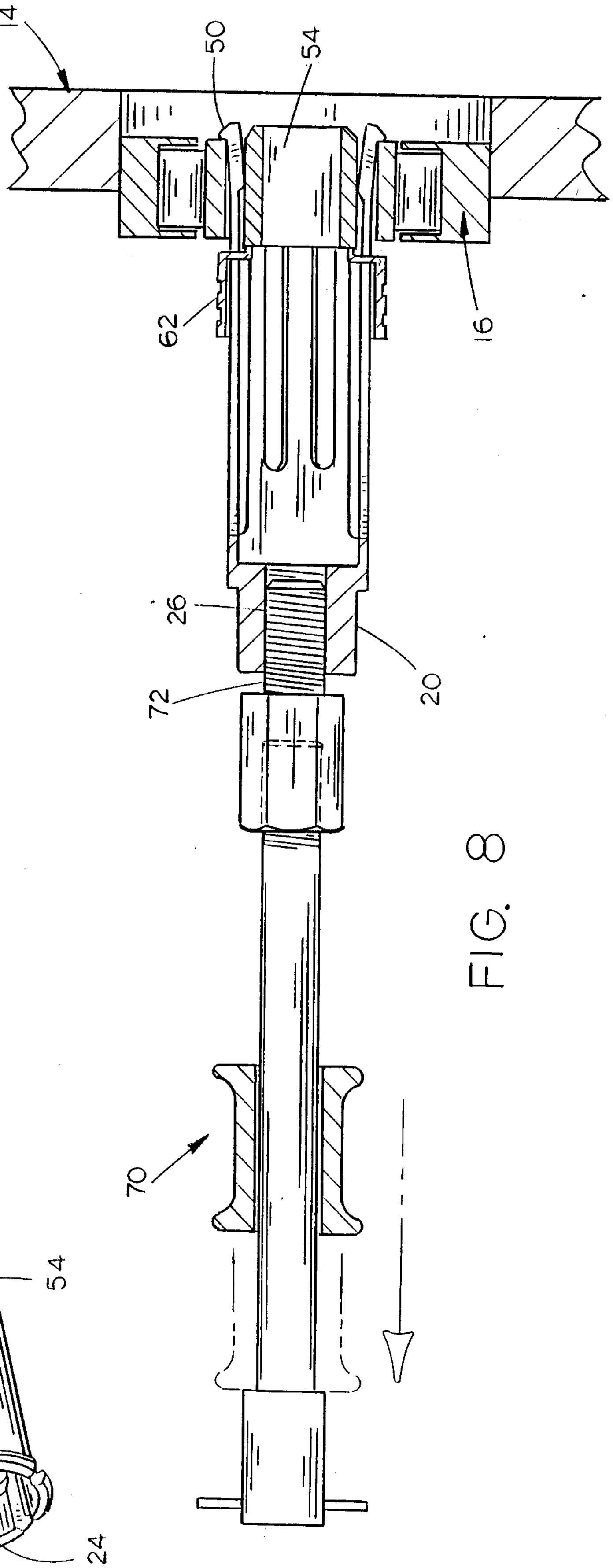

The preferred pulling device or puller of this invention is referred to by the reference numeral 10 while the reference numeral 12 refers to an embodiment which is illustrated in FIG. 7. The numeral 14 refers to a flywheel or the like having a pilot bearing 16 mounted therein. Bearing 16 is conventionally of the ball bearing type but is merely shown schematically in the drawings. For purposes of description, the numeral 17 refers to one end of a crankshaft of the engine with which the flywheel 14 is utilized. Although the drawings do not so indicate, it should be understood that the crankshaft 17 is secured to the flywheel 14 in conventional fashion. Pilot bearing 16 includes a central or annular opening 18 formed therein.

The puller 10 of this invention is designed to permit the removal of the pilot bearing 16 from the flywheel 14 without the necessity of removing the flywheel 14 from the vehicle. Although the device is particularly well-suited for removing the pilot bearing 16 from the flywheel 14, it should be understood that the tool has application for removing any annular member from its supporting member.

Figure 3:
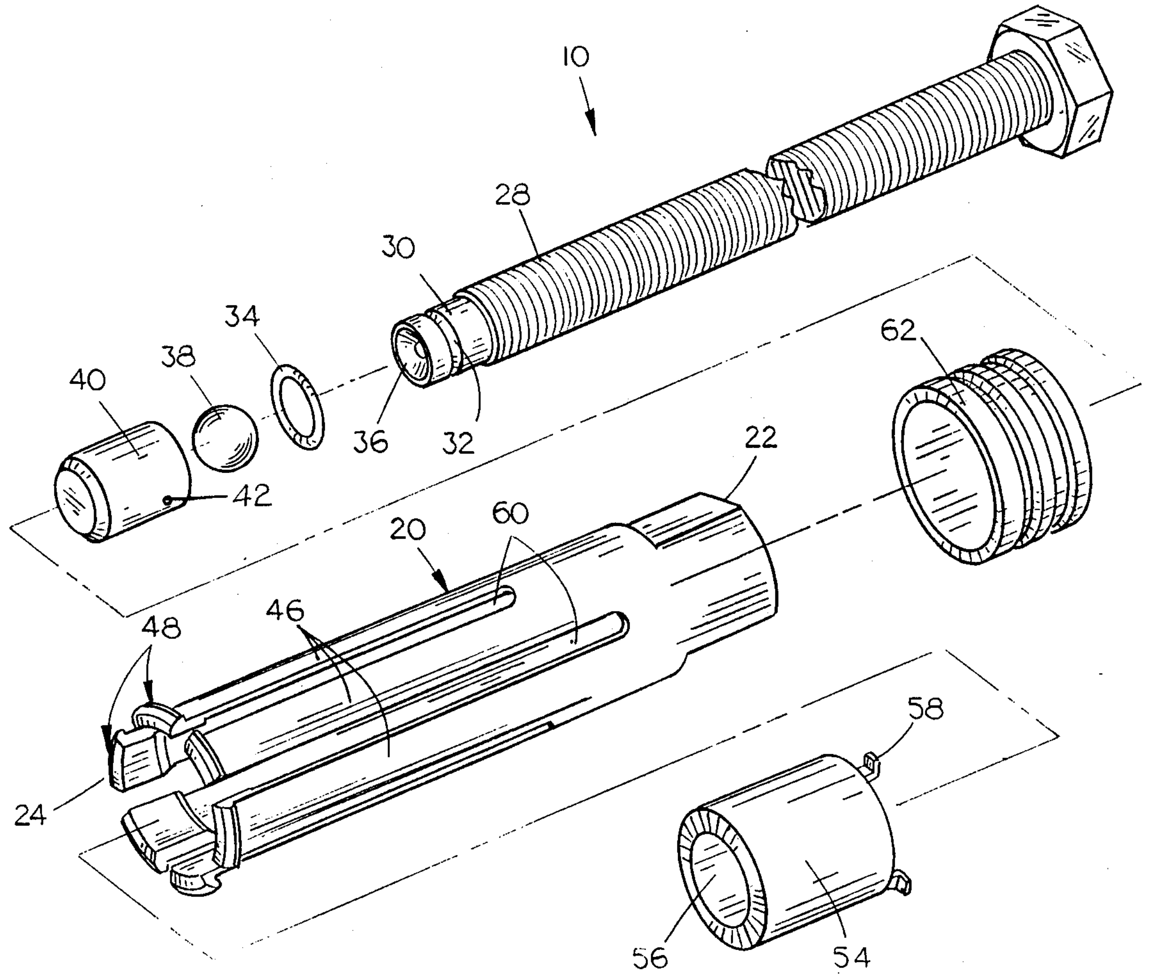
FIG. 3 is an exploded perspective view of the puller of this invention.
Figure 4:
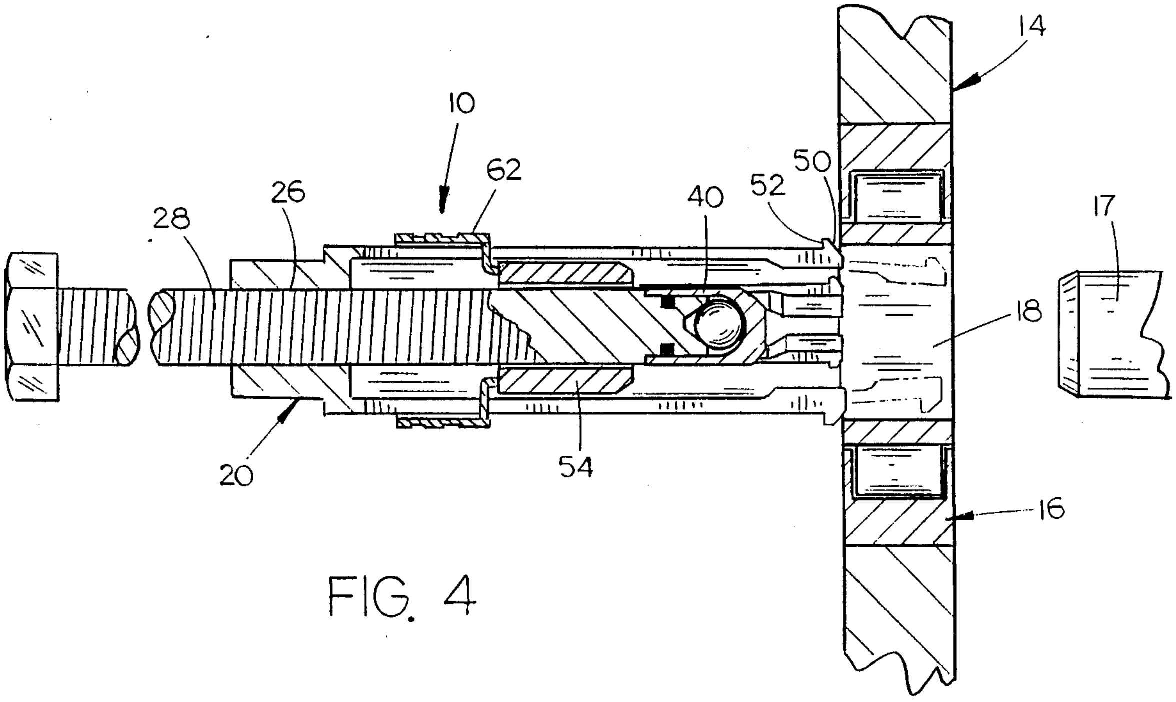

Puller 10 includes an elongated body member 20 having ends 22 and 24. End 22 of body member 20 is provided with an internally threaded opening 26 formed therein which is adapted to threadably receive bolt 28. As seen in FIG. 3, one end of bolt 28 is provided with an unthreaded portion 30 having an annular groove 32 formed therein which receives an O-ring 34. O-ring 34 is preferably comprised of a suitable rubber, Neoprene or other type of material. The end of bolt 28 is provided with a semi-circular recess 36 adapted to receive ball 38. A cup-shaped member 40 embraces ball 38, O-ring 34 and the end of bolt member 28 as best seen in FIG. 4. The frictional engagement between O-ring 34 and cup member 40 yieldably maintains the member 40 on bolt 28 while permitting rotation of bolt member 28 with respect to member 40. An air hole 42 in the side of cup-shaped member 40 allows air to be vented when cup-shaped member 40 is pushed onto the end of bolt member 28. It should be noted that member 40 is mounted on bolt 28 after bolt 28 has been sufficiently threaded through body member 20 to expose the end of the bolt 28.

Body member 20 includes a plurality of spaced-apart gripping arms 46 having outwardly or radially extending gripping teeth or portions 48 provided thereon. Each of the shoulders 48 includes a tapered surface 50 and a shoulder portion 52.

Gripping arms 46 further include an inwardly projecting boss 53 at the ends thereof. Each boss 53 extends longitudinally a short distance, and ends at an inner deflecting shoulder 53'. Thus, the interior diameter of body portion 20 is smaller at the end of gripping arms 46, than at a location intermediate the length of gripping arms 46.

Sleeve 54 is positioned within body member 20 and has a central opening 56 through which the bolt 28 extends. A plurality of lugs or fingers 58 are connected to the sleeve 54 and extend through the openings 60 between the arms 46 and are secured to actuator 62 which slidably embraces body member 20. Actuator 62 permits the sleeve 54 to be slidably moved from the position of FIG. 4 to the position of FIG. 6 as will be described in more detail hereinafter. The gripping arms 46 are constructed of a suitable steel material which permits their deflection from the position illustrated by solid lines in FIG. 4 to the position illustrated by broken lines in FIG. 4 to permit the gripping arms to be inserted through the central opening 18 in the bearing 16.

Figure 5:
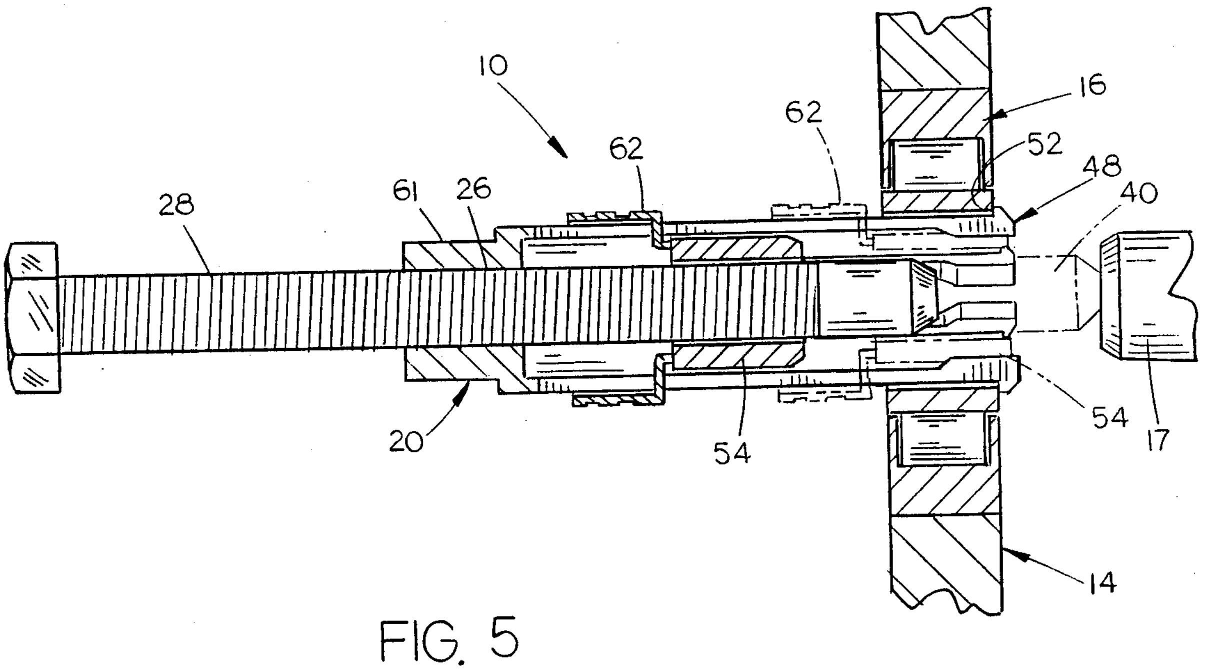
FIG. 5 is a view similar to FIG. 4 except that work-engaging members have been inserted through the annular opening of the bearing.

In operation, the bolt 28 is initially in the position relative to body member 20 as seen in FIG. 4 with the actuator 62 and the sleeve 54 being in the position also illustrated in FIG. 4. The tapered surfaces 50 of the teeth 48 are positioned adjacent the bearing 16 with inward longitudinal force then being applied to the puller 10 to cause the gripping arms 46 to be deflected inwardly to the position illustrated by broken lines in FIG. 4 so that the ends of the gripping arms 46 are extended through the opening 18 of the bearing 16 until the position of FIG. 5 is achieved at which time the resiliency of the gripping arms 46 causes the teeth 48 to position themselves with respect to the bearing 16 so that the shoulders 52 are positioned adjacent the bearing 16 as illustrated in FIG. 5. Actuator 62 is then moved from the position illustrated by solid lines in FIG. 5 to the position illustrated by broken lines in FIG. 5 which causes the sleeve 54 to also be moved from the position illustrated by solid lines in FIG. 5 to the position illustrated by broken lines in FIG. 5. As sleeve 54 is moved to the position of FIG. 5, it deflects bosses 53 and moves the ends of the arms 46 slightly outwardly so that the outer surfaces of the arms 46 are closely positioned adjacent the inside diameter of the bearing 16 and to ensure that substantially all of the shoulders 52 will be in engagement with the bearing. When the sleeve 54 is in the position illustrated by broken lines in FIG. 5 and by the solid lines in FIG. 6, the gripping arms 46 are prevented from inward deflection thereby ensuring that the gripping teeth 48 will remain in positive engagement with the bearing 16 to ensure that slippage will not occur.

Figure 1:
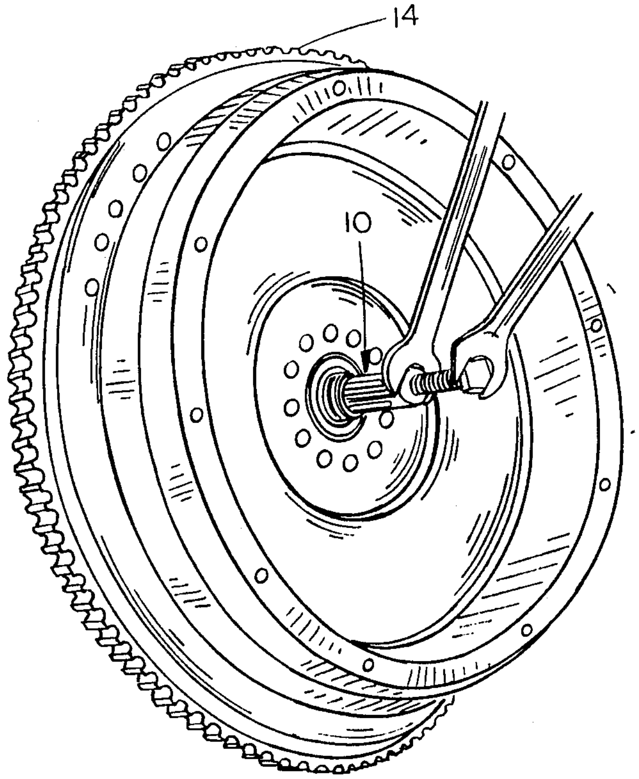
FIG. 1 is a perspective view illustrating the device of this invention to pull a bearing from a supporting member.
Figure 2:
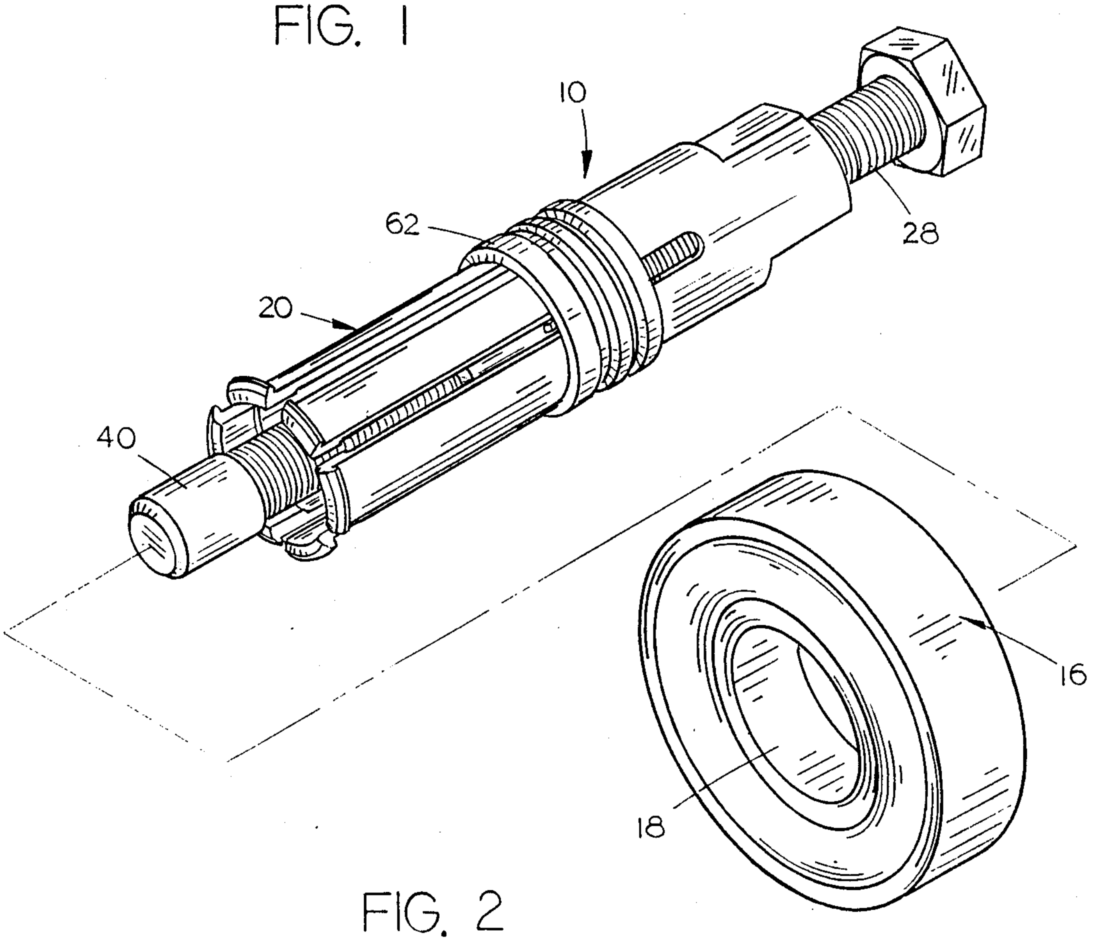
FIG. 2 is a perspective view of the puller of this invention and a bearing.
Figure 6:
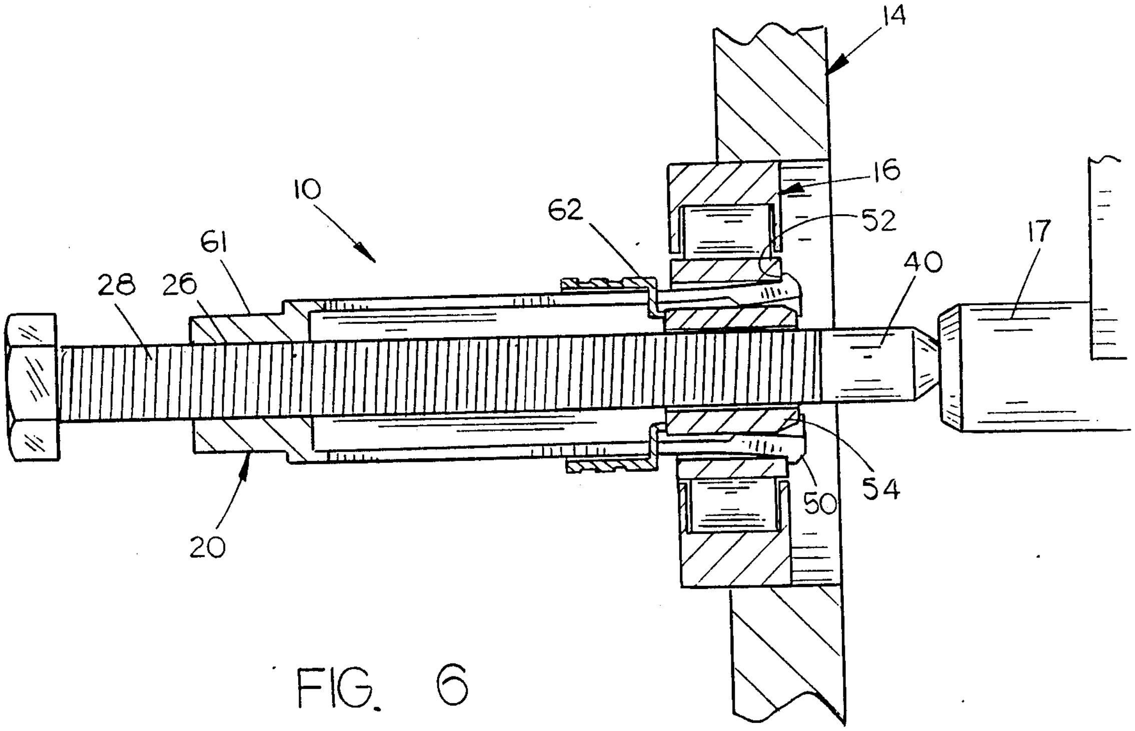
FIG. 6 is a view similar to FIGS. 4 and 5 except that the bearing is shown as being partially removed from its supporting member.

With the gripping teeth positioned as illustrated in FIG. 5, a wrench is positioned on the wrench receiving portion 61 and a wrench is positioned on the head of bolt 28 as seen in FIG. 1. Bolt 28 is then rotated until the member 40 moves into contact with the end of the crankshaft 17. Continued threadable rotational movement of the bolt 28 causes the bearing 16 to be pulled from flywheel 14 as illustrated in FIG. 6. It is important to note that the bolt 28 is rotated with respect to the member 40 during the pulling operation. Member 40 does not rotate with respect to the crankshaft 17 during the pulling operation. If the member 40 were permitted to rotate with respect to the crankshaft 17, the inner end of the bolt 28 could be laterally displaced which could affect the pulling operation.

Once the bearing 16 has been removed from the flywheel 14, the actuator 62 is again moved to the position illustrated in FIG. 5 so that the gripping arms 46 may be deflected inwardly to permit the bearing 16 to be removed from the device 10.

The embodiment of FIG. 7 functions in substantially the same way as that in FIGS. 1-6 except that the bolt 28 has been eliminated. In place of bolt 28, a conventional slide hammer assembly 70 is attached to the body member 20 by threadably inserting one end of the slide hammer assembly bolt 72 into the threaded opening 26.

Thus it can be seen that the invention accomplishes at least all of its stated objectives.

We claim:

1. A pulling device for pulling bearings or the like from a supporting member comprising,
- an elongated body member having inner and outer ends,
- said body member having an internally threaded bore at its outer end,
- said body member having a plurality of spaced-apart longitudinally extending gripping arms at its inner end,
- each of said gripping arms having a gripping shoulder means provided at the free end thereof which extends outwardly therefrom,
- each of said gripping arms having an inwardly projecting boss provided at the free end thereof;
- said gripping arms being comprised of a metal material which permits the free ends of said gripping arms to be selectively deflected towards one another, and away from one another,
- an elongated bolt member threadably mounted in said internally threaded bore and having an outer end positioned outwardly of the outer end of said body member and an inner end normally positioned between said gripping arms,
- a selectively longitudinally movable sleeve means positioned between said gripping arms and said bolt means and being longitudinally movable between a first position wherein it is positioned longitudinally of the free ends of said gripping arms and a second position wherein said sleeve gripping arms and a second position wherein said sleeve means engages said bosses and deflects the free ends of the gripping arms outwardly and prevents the inward deflection of said gripping arms thereby maintaining the gripping shoulders in engagement with the member being pulled,
- and an actuator means positioned outwardly of said gripping arms which is operatively interconnected to said sleeve means for selectively moving said sleeve means between its said first and second positions.

2. The device of claim 1 wherein said body member has a wrench receiving portion on its outer end.

3. The device of claim 1 wherein each of said gripping shoulder means has a tapered surface provided thereon for enhancing the insertion of said gripping arms through the member being pulled.

4. The device of claim 1, wherein a member is rotatably mounted on the inner end of said bolt member for rotation about the longitudinal axis of said bolt member.

5. The device of claim 4 wherein said member is selectively removably mounted on said bolt member.

6. The device of claim 1 wherein said sleeve means has an outer diameter such that it deflects the bosses of the free ends of said gripping arms outwardly as said sleeve means is moved from its first position to its said second position.

7. The device of claim 4, wherein said member has a cup-shaped end, and further comprising a ball bearing operably received within the cup-shaped end of said member between said bolt end and said member, such that said member is rotatable with respect to the longitudinal axis of said bolt member.

* * * * *